United States Patent [19]
Sierens et al.

[11] Patent Number: 5,930,262
[45] Date of Patent: Jul. 27, 1999

[54] METHOD FOR TDMA MANAGEMENT, CENTRAL STATION, TERMINAL STATION AND NETWORK SYSTEM TO PERFORM THIS METHOD, FRAME STRUCTURE USED IN THIS METHOD

[75] Inventors: Christiaan Hendrik Jozef Sierens, Mortsel; Peter Michel Noel Vandenabeele, Lier; Geert Arthur Edith Van Wonterghem, Eeklo, all of Belgium

[73] Assignee: Alcatel N.V., Rijswijk, Netherlands

[21] Appl. No.: 08/691,258

[22] Filed: Aug. 2, 1996

[30] Foreign Application Priority Data

Aug. 11, 1995 [EP] European Pat. Off. .............. 95202191

[51] Int. Cl.$^6$ .................................................. H04B 7/212
[52] U.S. Cl. .......................................... 370/442; 370/443
[58] Field of Search ..................................... 370/328, 329, 370/336, 337, 347, 348, 349, 395, 442, 437, 465, 470, 471, 472, 476, 216, 443, 462

[56] References Cited

U.S. PATENT DOCUMENTS

| | | | |
|---|---|---|---|
| 4,742,512 | 5/1988 | Akashi et al. | 370/347 |
| 4,809,268 | 2/1989 | Tejima et al. | 370/346 |
| 4,949,395 | 8/1990 | Rydbeck | 370/435 |
| 5,353,285 | 10/1994 | Van Der Plas et al. | 370/443 |
| 5,384,777 | 1/1995 | Ahmadi et al. | 370/443 |
| 5,533,028 | 7/1996 | Hita De La Torre et al. | 370/442 |
| 5,570,355 | 10/1996 | Dail et al. | 370/442 |
| 5,570,364 | 10/1996 | Bar-David | 370/462 |
| 5,617,412 | 4/1997 | Delprat et al. | 370/329 |
| 5,619,504 | 4/1997 | Van Grinsven et al. | 370/347 |
| 5,638,371 | 6/1997 | Raychaudhuri et al. | 370/349 |
| 5,640,395 | 6/1997 | Hamalainen et al. | 370/337 |
| 5,710,756 | 1/1998 | Pastermak et al. | 370/216 |
| 5,754,535 | 5/1998 | Vandenabeele et al. | 370/442 |
| 5,761,197 | 6/1998 | Takefman | 370/337 |

FOREIGN PATENT DOCUMENTS

| | | |
|---|---|---|
| 0493287 | 12/1991 | European Pat. Off. . |
| 0621708 | 10/1994 | European Pat. Off. . |
| 4233581 | 4/1994 | Germany . |

OTHER PUBLICATIONS

"ATM–Based Hybrid Fiber Coax System", P. Vandenabeele et al, *Contribution to IEEE 802.14*, Dallas, May 1995, pp. 1–18.

"Cable–TV Protòcols for Metropolitan and Regional Communicatio Systems", J. Mollenauer et al, *Inoperability in Broadband Networks,*, S. Rao (ed.) IOS Press, Amsterdam, 1994, "Proceedings of Interworking 94—2nd Int'l Symposium on Interworking", Sophia Antipolis, France, May 4–6, 1994, pp. 238–249.

*Primary Examiner*—Dang Ton
*Assistant Examiner*—Phirin Sam
*Attorney, Agent, or Firm*—Ware, Fressola, Van Der Sluys & Adolphson LLP

[57] ABSTRACT

The method is used in a system comprising a central station (CS) coupled to each of a plurality of terminal stations (TS1–TSn), wherein the central station (CS) is enabled to transmit downstream frames (DS) to the terminal stations to allow the terminal stations to transfer upstream frames (US) to the central station in time slots assigned thereto by way of of access grant information (TEA1–TEA4) included in the downstream frames. The downstream frame (DS) is a superframe having a matrix structure with rows and columns, and a first portion and a second portion of the matrix structure is an overhead portion (S, TCB) and an information portion (ATM) respectively. The overhead portion includes the access grant information and the size of the overhead portion is flexibly adaptable. The central station and the terminal stations are adapted to send and to interpret the superframe.

18 Claims, 2 Drawing Sheets

5,930,262

METHOD FOR TDMA MANAGEMENT, CENTRAL STATION, TERMINAL STATION AND NETWORK SYSTEM TO PERFORM THIS METHOD, FRAME STRUCTURE USED IN THIS METHOD

TECHNICAL FIELD

The present invention relates to a method for Time Division Multiplexing (TDMA) management, to a central station, a terminal station and a network system to perform this method, and to frames used in this method.

BACKGROUND OF THE INVENTION

Such a method, central station, terminal station network system and frames are already known in the art e.g. from the IEEE 802.14 contribution (Dallas May 1995) "ATM-based Hybrid Fiber Coax System" by Peter Vandenabeele and Chris Sierens. Therein a system is described over which broadcast video and interactive services are provided by a central station for a plurality of terminal stations. The video services are provided by means of downstream RF channels containing an MPEG2 Transport Stream (MPEG2-TS), while the interactive services are provided using downstream RF channels containing a frame with a combination of Asynchronous Transfer Mode (ATM) cells and TDMA control information, i.e. Access Grant Information (AGI) to control the sending of upstream frames from the terminal station to the central station. Two types of modes are defined in this document : a standard mode and a high mode. In standard mode the frame contains 748 bytes split in 6 bytes for TDMA control information and the rest for ATM cells, and in high mode the frame contains 6 bytes for TDMA control information and 181 bytes for ATM cells. The latter frame is used for high upstream bit rates.

Since the number of bytes foreseen in these frames for TDMA signalling and thus also the number of AGI is restricted, it is clear that there is also a restriction in this system on the upstream data rate and on the relation between the upstream and downstream rates, the upstream data rate being the sum of the data rates of all upstream channels controlled by one downstream channel. Additionnally only a fixed number of terminal stations can be controlled by one downstream frame.

DISCLOSURE OF INVENTION

An object of the invention is to provide a method of the above known type but which is more flexible with respect to transmission rates and to the number of terminal stations to be controlled.

According to a first aspect of the present invention, a method for time division multiple access management in a system comprising a central station coupled to each of a plurality of terminal stations, said central station for transmitting downstream frames to said terminal stations and for allowing said terminal stations to transfer upstream frames to said central station in time slots assigned thereto by means of access grant information included in said downstream frames, is characterized in that each of said downstream frames is a superframe having a matrix structure with rows and columns, a first portion and a second portion of said matrix structure being an overhead portion and an information portion respectively, said overhead portion including said access grant information and the size of said overhead portion being flexibly adaptable.

According to a second aspect of the present invention, a central station for a time division multiple access system in which said central station is coupled to each of a plurality of terminal stations, said central station including generation means for generating downstream frames including access grant information, and transmission means to transmit said downstream frames to said terminal stations to allow said terminal stations to transfer upstream frames to said central station in time slots assigned thereto by means of said access grant information, is characterized in that each of said downstream frames is a superframe having a matrix structure with rows and columns, a first portion and a second portion of said matrix structure being an overhead portion and an information portion respectively, and that said generation means is adapted to insert said access grant information in said overhead portion and to flexibly adjust the size of said overhead portion according to a predetermined size value.

According to a third aspect of the present invention, a terminal station for a time division multiple access system in which a central station is coupled to a plurality of terminal stations, each of said plurality of terminal stations being similar to said terminal station, said terminal station including reception means for receiving a downstream frame transmitted by said central station via said system to said terminal station and interpretation means for interpreting said downstream frame, said downstream frame including access grant information to allow said terminal stations to transfer upstream frames to said central station in time slots assigned thereto by means of said access grant information, is characterized in that each of said downstream frames) is a superframe having a matrix structure with rows and columns, a first portion and a second portion of said matrix structure being an overhead portion and an information portion respectively, the size of said first portion being variable and that said interpretation means is adapted to detect and to interpret said access grant information in said overhead portion taking into account a predetermined size value indicative of the size of said overhead portion.

According to a fourth aspect of the present invention, a time division multiplex system comprising a central station coupled to each of a plurality of terminal stations, said central station being enabled to transmit downstream frames to said terminal stations and to allow said terminal stations to transfer upstream frames to said central station in time slots assigned thereto by means of access grant information included in said downstream frames, is characterized in that each of said downstream frames is a superframe having a matrix structure with rows and columns, a first portion and a second portion of said matrix structure being an overhead portion and an information portion respectively, that said central station includes generation means adapted to insert said access grant information in said overhead portion and to flexibly adjust the size of said overhead portion according to a predetermined size value, and that each of said terminal stations includes interpretation means adapted to detect and to interpret said access grant information in said overhead portion taking into account said predetermined size value.

According to a fifth aspect of the present invention, a frame for transmission, in a system including a central station coupled to a plurality of terminal stations, from said central station to said terminal stations, said frame including access grant information to allow said terminal station to transfer upstream frames to said central station, is characterized in that said frame is a superframe having a matrix structure with rows and columns, a first portion and a second of said matrix structure being an overhead portion and an information portion respectively, said overhead portion including said access grant information and the size of said overhead portion being flexibly adaptable.

Indeed, by foreseeing in the superframe an overhead portion which is flexibly adaptable, this portion and thus also the TDMA control information such as the AGI and consequently the number of upstream channels controlled by one downstream channel can increase or decrease according to the supported rates and to the number of terminal stations to be controlled. Moreover the superframe is suited for inband as well as for outband signalling.

To enable the terminal stations to decode the downsteam frame, the stations are informed about the size of this overhead portion either by inserting information related to this size in the overhead portion, by transmitting this information to the terminals in operation and maintenance frames or by preconfiguring this information in the terminal stations as described below. The latter way of informing the terminal stations about the size of the overhead portion implies that whenever this size is adapted the preconfigured information has also to be adapted, e.g. by operator intervention.

Another characteristic feature of the present invention is that each of the rows of the matrix forming the superframe is compatible with an MPEG2-TS, thereby making possible to intermix broadband video (DVB) frames with TDMA frames in an advantageous way.

A further characteristic feature is that the overhead and information portions of the matrix comprise complete columns and the number of rows in the superframe equals the number of bytes in an ATM cell. This ensures that an entire number of ATM cells can always be included in the frame.

Still a further characteristic feature of the present invention is that the number of bytes in a row equals 204 and that the number of bytes in upstream frames equals 68.

In this way, and as will be explained later, the upstream frame can contain an ATM cell, the downstream frame is compatible with an MPEG2-TS and an entire number of upstream frames can be controlled by a downstream frame An additional characteristic feature of the invention is that upstream frames include an overhead part and an information part and that the size of overhead part is flexibly adaptable.

In this way the system is rendered even more flexible.

A further characteristic feature of the invention is that part of access grant information contains a predetermined code indicating that any one of terminal stations is allowed to transfer upstream frames, whereby a combination of the TDMA and the Aloha or contention technique can be realized.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
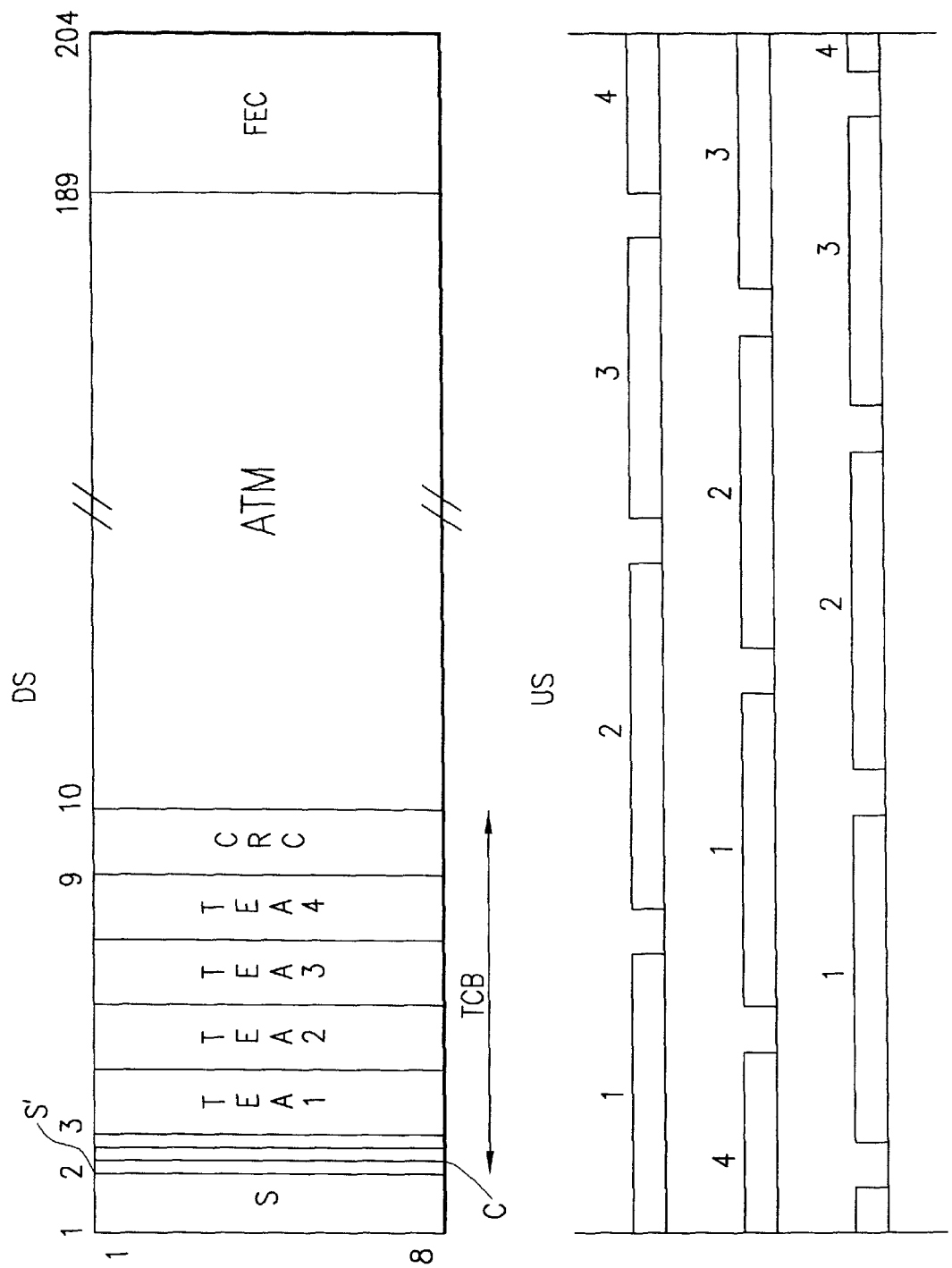
FIG. 1 is a representation of a downstream frame structure and associated upstream burst structures according to the invention.
Figure 2:
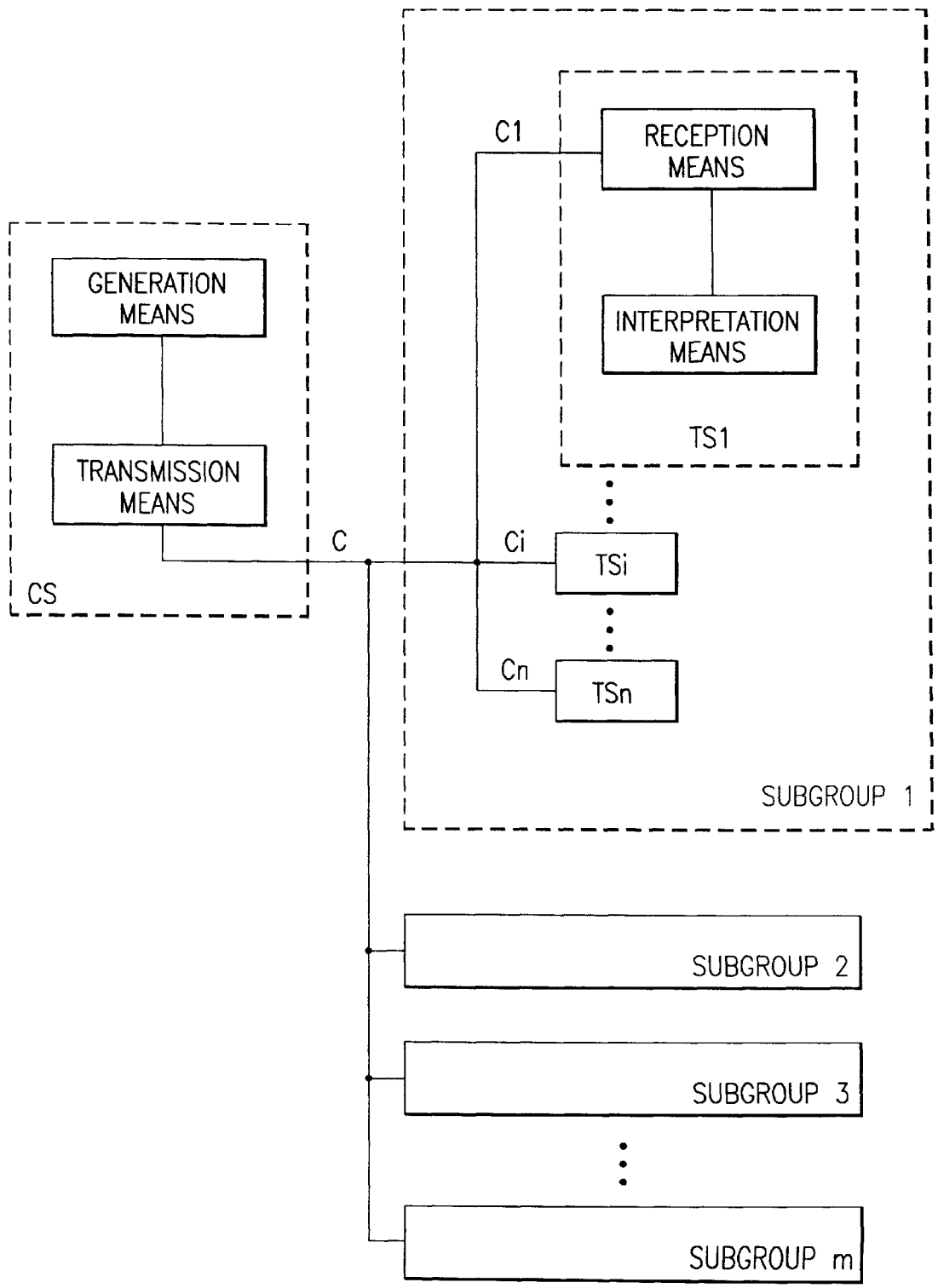
FIG. 2 is a schematic representation of a network system according to the invention.

FIG. 1 represents a downstream frame structure DS and an associated upstream burst stream US structure for use in a network system as shown in FIG. 2 wherein downstream frames DS are transmitted from a central station CS to a plurality of terminal stations TS1–TSn over the cascade connection of a common transmission path c and individual transmission paths C1–Cn, and wherein upstream bursts UB are transferred from the terminal stations to the central station via time division multiple access (TDMA). Such a network is for instance used for interactive services, such as video on demand and video broadcasting. In the considered embodiment the upstream and downstream rates are considered equal, e.g. 2.048 Mb/s, to simplify the description of the working of the system, but the invention is equally well applicable to systems where the upstream and downstream rate are different. The upstream channel is shared by a plurality of terminal stations, 4 in the considered embodiment, and is thereto divided in time slots 1, 2, 3, 4, allocated to the terminal stations by means of access grant information or transmit enable (TEA) information included in DS.

The downstream frame is 204 bytes long and is compatible with a Digital Video Broadcast (DVB) frame that is standardized for distribution of MPEG-TS over cable. The frame consists of an MPEG2 frame of 188 bytes, to which a Reed-Solomon FEC of 16 bytes is added for error correction on the ATM part or on both the ATM and the TDMA control block part. The first byte of this frame is a predetermined synchronization byte S. Byte 2 to 188 can be used for user data. Using the frame as a basic block (row), a superframe is constructed of 8 consecutive frames. The superframe is divided in columns containing dedicated blocks. The column containing the first byte of every frame contains a synchronization byte S of the DVB frame as mentioned earlier. The next 8 columns form a TDMA Control Block TCB which contains 1 bit for superframe synchronization S', a second bit for specifying a counter C for slot synchronization of the TDMA and per row maximum 4 Transmit Enable Addresses TEA1–TEA4 for specification of the terminal station allowed to send information in a corresponding timeslot of the upstream channel. The counter value composed of the above mentioned second bit in the 8 rows is used for synchronization of an 8 bit cyclic counter for the upstream TDMA as explained later on. The next six bits of each row of TCB are reserved for other use.

Each frame of the upstream burst is 60 bytes long and consists of a preamble, an ATM cell, an error code and a guard band. The parts of the frames are not shown in FIG. 1, and will not be considered further since they are not relevant for the invention.

In the following the principle working of the upstream TDMA is explained. More detailed information with respect to this working can be found in the earlier cited IEEE contribution and in the related European Patent Application EPA 95201108.8.

Two features are required to realize TDMA: slot synchronization, i.e. determining at what instant in time or in which time slot a terminal station may transmit information, and terminal addressing, i.e. indicating which terminal station may send upstream information.

The slot synchronization is executed by means of cyclic synchronization counters. The central station has a master counter that counts up to a predetermined value, then returns to zero and starts counting again. This counter counts with the speed of the downstream bytes. At each zero crossing of that counter, one terminal station may send an upstream burst. Every terminal station has a similar local counter, the slave counter that also counts up to the same predetermined value as the central station, and at the same speed (one increase per received downstream byte). To synchronize the counters in all the terminal stations with the central counter, the value of the latter counter is broadcast on regular intervals by the central station to the terminal stations, in the field C of the downstream frame. In case of equal upstream and downstream rate as in the described embodiment, the predetermined value of the counters equals the length of the upstream burst. For embodiments with a downstream rate which is higher than the upstream rate, the predetermined counter values have to be adapted accordingly. For the present case of an upstream burst length of 60 bytes, i.e. 58 transmitted bytes and a guard band of 2 bytes, there is an average of 204/60=3.4 upstream bursts per downstream frame. It should be noted that an upstream burst length of 68 would ensure exactly 3 upstream channels for one downstream channel.

The TEAs listed in the downstream frame indicate which terminal station may upon the consecutive zero crossing of its counter transmit an upstream burst. If 4 upstream bursts have to start during a specific downstream frame, then 4 TEA's will be required in the corresponding row of the TCB part of the downstream frame. If only 3 upstream bursts have to start, the fourth TEA is assigned a zero value by the central station. Typically, a row of the TCB controls the burst starting transmission during the next frame. It cannot control transmission during the current frame, since some latency is required for processing the TEA in the terminal station.

It should be noted that use could be made of special code TEAs as a result of which any terminal station would be allowed to transfer upstream information, thereby realizing a combination of TDMA and of the Aloha or contention principle. Acknowledgements could then be broadcast in operation and maintenance messages.

A more detailed description of the slot synchronization and terminal addressing and of the practical implementation thereof in the central station and in the terminal stations can be found in the above mentioned IEEE contribution and the related European Patent Application.

Supposing a future extension of the services, it may be required to offer more upstream bandwidth to the terminal stations, i.e. to have more upstream channels being controlled by one downstream channel. In this case, the TDMA control block of 8 columns wide is duplicated a number of time in the superframe at the cost of the ATM block. The value of the TDMA control block is communicated to the user stations to enable them to decode the superframe. This communication can be done in several ways, by including the value in the superframe and more specifically in the earlier mentioned bits for further use, by including the value in operation and maintenance (OAM) downstream frames, by operator intervention.

In a similar way, the size of the TDMA control block can be adapted in case of changed configuration, i.e. increase or decrease of the number of terminal stations, or when for instance upstream frames of 68 bytes are used and only 3 upstream channels have to be controlled by an upstream channel.

It should also be noted that the size of the frame part containing the FEC code could be made flexible.

No further details are given with respect to the realization of embodiments of a central station and of terminal stations according to the invention, since for a person skilled in the art this realization is obvious based on the above functional description of the invention and taking into account the known implementation of a system as described in the referred documents.

It has to be noted that although in the considered embodiment the number of rows of the superframe is taken equal to 8, this is not by way of restriction. Indeed, the number of rows can have any value. In the considered embodiment a number equal to 8 was chosen because of the number of bits in a byte. The number of rows could in another advantageous implementation be taken equal to 53 which corresponds to the number of bytes in an ATM cell.

Also to be noted that the connection between the central station and the terminal station can be realized by means of for instance a satellite communication path or a cellular radio network path or a hybrid fiber coax network comprising the cascade connection of an optical fiber, a converting unit including an electro-optical convertor and an opto-electrical converter, and coax cables, all not shown in FIG. 2. In the latter network subgroups of terminal stations can be defined which are separated in downstream and upstream direction by frequency division multiplexing, each these subgroup including terminal stations which share a single upstream carrier by time division multiple access.

Additionally, the above described principle of having a flexible overhead part could be applied to the upstream frames.

While the principles of the invention have been described above in connection with specific apparatus, it is to be clearly understood that this description is made only by way of example and not as a limitation on the scope of the invention.

We claim:

1. Method for time division multiple access (TDMA) management in a system comprising a central station (CS) coupled to each of a plurality of terminal stations (TS1–TSn), said central station (CS) for transmitting downstream frames (DS) to said terminal stations and for allowing said terminal stations to transfer upstream frames (US) to said central station in time slots assigned thereto by means of access grant information (TEA1–TEA4) included in said downstream frames, characterized in that each of said downstream frames (DS) is a superframe having a matrix structure with rows and columns, a first portion and a second portion of said matrix structure being an overhead portion (S, TCB) and an information portion (ATM) respectively, said overhead portion including said access grant information and the size of said overhead portion being flexibly adaptable.

2. Method according to claim 1, characterized in that information related to said size is included in said overhead portion.

3. Method according to claim 1, characterized in that information related to said size is transferred from said central station (CS) to said terminal stations (TS1–TSn) by means of downstream maintenance frames transmitted in said system.

4. Method according to claim 1, characterized in that information related to said size is preconfigured in each of said terminal stations (TS1–TSn).

5. Method according to claim 1, characterized in that each one of said rows is compatible with an MPEG2 Transport Stream.

6. Method according to claim 1, characterized in that said first portion and said second portion of said matrix are constituted by a first portion and a second portion of complete columns respectively and that the number of rows in said superframe equals the number of bytes in an Asynchronous Transfer Mode (ATM) cell.

7. Method according to claim 1, characterized in that the number of bytes in each row of said rows equals 204 and that the number of bytes in said upstream frames equals 68.

8. Method according to claim 1, characterized in that said upstream frames include an overhead part and an information part and that the size of said overhead part is flexibly adaptable.

9. Method according to claim 1, characterized in that part of said access grant information (TEA1–TEA2) contains a predetermined code indicating that any one of said terminal stations is allowed to transfer upstream frames.

10. Method according to claim 1, characterized in that by means of said access grant information a plurality of terminal stations is allowed to transmit upstream frames.

11. Central station (CS) for a time division multiple access (TDMA) system in which said central station is coupled to each of a plurality of terminal stations (TS1–TSn), said central station including generation means for generating downstream frames including access grant information (TEA1–TEA4), and transmission means to transmit said downstream frames to said terminal stations to allow said terminal stations to transfer upstream frames (US) to said central station in time slots assigned thereto by means of said access grant information, characterized in that each of said downstream frames is a superframe having a matrix structure with rows and columns, a first portion and a second portion of said matrix structure being an overhead portion (S, TCB) and an information portion (ATM) respectively, and that said generation means is adapted to insert said access grant information in said overhead portion and to flexibly adjust the size of said overhead portion according to a predetermined size value.

12. Terminal station (TS1; . . .; TSN), for a time division multiple access (TDMA) system in which a central station (CS) is coupled to a plurality of terminal stations (TS1–TSn), each of said plurality of terminal stations being similar to said terminal station, said terminal station including reception means for receiving a downstream frame (DS) transmitted by said central station via said system to said terminal station and interpretation means for interpreting said downstream frame, said downstream frame including access grant information (TEA1–TEA4) to allow said terminal stations to transfer upstream frames to said central station in time slots assigned thereto by means of said access grant information, characterized in that each of said downstream frames (DS) is a superframe having a matrix structure with rows and columns, a first portion and a second portion of said matrix structure being an overhead portion (S, TCB) and an information portion (ATM) respectively, the size of said first portion being variable and that said interpretation means is adapted to detect and to interpret said access grant information in said overhead portion taking into account a predetermined size value indicative of the size of said overhead portion.

13. Time division multiplex (TDMA) system according to claim 12, characterized in that said central station (CS) is coupled to said terminal stations (TS1–TSn) by means of a cellular radio network path.

14. Time division multiplex (TDMA) system comprising a central station (CS) coupled to each of a plurality of terminal stations (TS1–TSn), said central station being enabled to transmit downstream frames (DS) to said terminal stations and to allow said terminal stations to transfer upstream frames (US) to said central station in time slots assigned thereto by means of access grant information (TEA1–TEA4) included in said downstream frames, characterized in that each of said downstream frames (DS) is a superframe having a matrix structure with rows and columns, a first portion and a second portion of said matrix structure being an overhead portion (S, TCB) and an information portion (ATM) respectively, that said central station includes generation means adapted to insert said access grant information in said overhead portion and to flexibly adjust the size of said overhead portion according to a predetermined size value, and that each of said terminal stations includes interpretation means adapted to detect and to interpret said access grant information in said overhead portion taking into account said predetermined size value.

15. Time division multiplex (TDMA) system according to claim 14, characterized in that said central station (CS) is coupled to said terminal stations (TS1–TSn) by means of a hybrid fiber coax (HFC) network comprising the cascade connection of an optical fiber, a converting unit including an electro-optical convertor and an opto-electrical converter, and coax cables, and that subgroups of said terminal stations are separated in downstream and upstream direction by frequency division multiplexing, each said subgroup including terminal stations which share a single upstream carrier by time division multiple access (TDMA).

16. Time division multiplex (TDMA) system according to claim 14, characterized in that said centrical station (CS) is coupled to said terminal stations (TS1–TSn) by means of a satellite communication path.

17. Frame (DS) for transmission, in a system including a central station (CS) coupled to a plurality of terminal stations (TS1–TSn), from said central station to said terminal stations, said frame including access grant information (TEA1–TEA4) to allow said terminal station to transfer upstream frames (US) to said central station, characterized in that said frame (DS) is a superframe having a matrix structure with rows and columns, a first portion and a second portion of said matrix structure being an overhead portion (S, TCB) and an information portion (ATM) respectively, said overhead portion including said access grant information (TEA1–TEA4) and the size of said overhead portion being flexibly adaptable.

18. Frame according to claim 17, characterized in that said overhead portion is divided in two subportions, one of which contains an error code.

* * * * *

UNITED STATES PATENT AND TRADEMARK OFFICE
CERTIFICATE OF CORRECTION

PATENT NO : 5,930,262
DATED : July 27, 1999
INVENTOR(S): Sierens et al

It is certified that error appears in the above-identified patent and that said Letters Patent is hereby corrected as shown below:

At column 8, line 34, please cancel "centrical" and substitute --central-- therefor.

Signed and Sealed this

Eighteenth Day of July, 2000

Attest:

Q. TODD DICKINSON

Attesting Officer

Director of Patents and Trademarks